United States Patent
Firoiu et al.

(10) Patent No.: US 9,313,813 B2
(45) Date of Patent: Apr. 12, 2016

(54) SKYPOINT FOR MOBILE HOTSPOTS

(71) Applicant: BAE Systems Information and Electronic Systems Integration Inc., Nashua, NH (US)

(72) Inventors: Victor Firoiu, Westford, MA (US); Scott B. LaPrise, Arlington, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 14/803,545

(22) Filed: Jul. 20, 2015

(65) Prior Publication Data

US 2015/0327302 A1    Nov. 12, 2015

Related U.S. Application Data

(63) Continuation of application No. 13/911,749, filed on Jun. 6, 2013, now Pat. No. 9,119,179.

(60) Provisional application No. 61/656,306, filed on Jun. 6, 2012.

(51) Int. Cl.
| | |
|---|---|
| *H04W 4/00* | (2009.01) |
| *H04W 76/02* | (2009.01) |
| *H04W 76/06* | (2009.01) |
| *H04B 7/185* | (2006.01) |
| *H04W 16/18* | (2009.01) |
| *H04W 16/22* | (2009.01) |

(52) U.S. Cl.
CPC ........... *H04W 76/02* (2013.01); *H04B 7/18506* (2013.01); *H04W 16/18* (2013.01); *H04W 76/06* (2013.01); *H04W 16/22* (2013.01)

(58) Field of Classification Search
CPC ..... H04W 64/00; H04W 4/028; H04W 4/008; H04W 84/18; H04W 36/16; H04W 40/28; H04W 48/20; H04W 4/027
USPC ........................ 455/436, 432.1, 442, 440, 441
See application file for complete search history.

(56) References Cited

U.S. PATENT DOCUMENTS

2010/0039984 A1    2/2010    Brownrigg

OTHER PUBLICATIONS

Fabrice Tchakountio and Ram Ramanathan, Anticipatory Routing for Highly Mobile Endpoints, IEEE Workshop on Mobile Computing Systems and Applications (WMCSA 2004).

(Continued)

*Primary Examiner* — Tu X Nguyen
(74) *Attorney, Agent, or Firm* — Daniel J. Long; Sand & Sebolt

(57) ABSTRACT

A system and method for dynamically planning a network is presented. One method may begin by determining network parameters for connecting nodes to a network and decision variables associated with radios and/or nodes in the network. Constraints may be established to narrow possible values of the network parameters and/or the decision variables. The constraints may be based on one or more of: values associated with connecting a radio to a node in the network, values associated with connecting two nodes in the network together over a communication link, whether a node can connect to a GIG node and a flow balance in the GIG node. To find possible links in the network that are optimal, the method may minimize an equation based on the network parameters, constraints and decision variables to determine optimal communication links between pairs of nodes in the network, pairs of nodes and radios and/or pairs of radios.

1 Claim, 9 Drawing Sheets

(56) References Cited

OTHER PUBLICATIONS

Dr. Larry B. Stotts, Mr. Brian Stadler, Dr. Paul Kolodzy, Dr. Alan Pike, Dr. Thomas G. Moore, Dr. David W. Young, Mr. Randy Smith, Dr. Zachary Bagley, Dr. Ned Plasson, Dr. Buzz Graves, Dr. Dave Daugherty, Dr. Jeff Douglas, and Mr. Todd Martin, Optical RF Communications Adjunct: Coming of Age, IEEE 2009.

Ram Ramanathan, Jason Redi, Cesar Santivanez, David Wiggins, and Stephen Polit, Ad Hoc Networking With Directional Antennas: A Complete Systems Solution, IEEE Journal on Selected Areas in Communications, vol. 23, No. 3, Mar. 2005.

K. Nichols, S. Blake, F. Baker, and D. Black, Definition of the Differential Services Field (DS Field) in the IPv4 and IPv6 Headers, Memo, The Internet Society, 1998.

Tien-Yow Liu and Robert A. Scholtz, Link Activation Protocols for a Mobile Communication Network with Directive/Adaptive Antennas, IEEE Transactions on Communications, vol. 48, No. 1, Jan. 2000.

Sung-Ju Lee, William Su, and Mario Gerla, Ad Hoc Wireless Multicast with Mobility Prediction, IEEE 1999.

Milosh Ivanovich, Philip W. Bickerdike, and Jonathan C. Li, on TCP Performance Enhancing Proxies in a Wireless Environment, Topics in Radio Communications, IEEE Communications Magazine, Sep. 2008.

Ece Gelal, Gentian Jakllari, Srikanth V. Krishnamurthy, and Neal E. Young, An Integrated Scheme for Fully-Directional Neighbor Discovery and Topology Management in Mobile Ad Hoc Networks, IEEE 2006.

Victor Firoiu, Greg Lauer, Brian Decleene, and Soumendra Nanda, Concerto: Experiences with a Real-World MANET System Based on Network Coding (Chapter 6), Network Coding, 2012.

Victor Firoiu, Greg Lauer, Brian Decleene, and Soumendra Nanda, Experiences with Network Coding within MANET Field Experiments, The 2010 Military Communications Conferences, IEEE 2010.

B. Davie, A. Charny, J.C.R. Bennett, K. Benson, J.Y. Le Boudec, W. Courtney, S. Davari, V. Firoiu, and D. Stiliadis, An Expedited Forwarding PHB (Per-Hop Behavior), Memo, The Internet Society, 2001.

Osama Bazan and Muhammad Jaseemuddin, A Survey on MAC Protocol for Wireless Adhoc Networks with Beamforming Antennas, IEEE Communications Surveys & Tutorials, vol. 14, No. 2, Second Quarter 2012.

Prithwish Basu, Jason Redi, and Vladimir Shurbanov, Coordinated Flocking of UAVs for Improved Connectivity of Mobile Ground Nodes, MILCOM 2004—2004 IEEE Military Communications Conference.

| Network Parameters | Notation: n,m = nodes (0=GIG gateway), i, j = mmW radios |
|---|---|
| (P1) $c(m,n,t)$ | Cost of link between nodes m, n. Default = 1. |
| (P2) $C(m,t)$ | Penalty of disconnecting node m to GIG. =Large for high QoS |
| (P3) $q(m,i,n,j,t)$ | =0 Radios i,j cannot connect (angle, distance, polarity); otherwise 1 |

| Decision Variables | |
|---|---|
| (V1) $y(m,i,n,j,t)$ | =1 Radio i on node m connected to radio j on node n; otherwise 0 |
| (V2) $x(m,n,t)$ | Flow between nodes m and n |
| (V3) $b(m,t)$ | =1 If node m has path to GIG; otherwise 0 |

| Integer Programming Objective | |
|---|---|
| (Obj) $\min\{\Sigma_m C(m,t)(1-b(m,t)) + \Sigma_{n,m} c(m,n,t)x(m,n,t)\}$ | Min total path cost |

| Constraints | | |
|---|---|---|
| (1) $\Sigma_{n,j} y(m,i,n,j,t) \leq 1$ | | Radio i can only be connected with one other radio |
| (2) $y(m,i,n,j,t) \leq q(m,i,n,j,t)$ | | Radio connection limited by physical constraints |
| (3) $x(m,n,t) \leq N \Sigma_{i,j} y(m,i,n,j,t)$ | | Flow m,n =0 if not connected, otherwise unlimited |
| (4) $\Sigma_n x(m,n,t) - \Sigma_n x(n,m,t) = b(m,t)$ | | m connected to GIG if balance flow =1 |
| (5) $\Sigma_n x(n,0,t) - \Sigma_n x(0,n,t) = \Sigma_{m\neq 0} b(m,t)$ | | Flow balance in GIG node (0) |

FIG-8

SKYPOINT FOR MOBILE HOTSPOTS

CROSS REFERENCE TO RELATED APPLICATION

This is a divisional of U.S. application Ser. No. 13/911,749 filed Jun. 6, 2013 and claims priority from U.S. Provisional Patent Application Ser. No. 61/656,306, filed Jun. 6, 2012; the disclosure of which is incorporated herein by reference.

BACKGROUND OF THE INVENTION

1. Field of Invention

The current invention relates generally to apparatus, systems and methods for computer networking. More particularly, the apparatus, systems and methods relate to connecting a mobile device to a computer network. Specifically, the apparatus, systems and methods provide for looking at two or more possible links to connect to and how to select the optimal link to connect with.

2. Description of Related Art

Many discovery techniques exist to find a node within a radio network. A common approach is to use an omni radio link. However, to cover the maximum range (distance) with bursty discovery packets, it is necessary to allocate substantial size, weight and power (SWAP). A radio considered for such a purpose is Link 16. By contrast, an Iridium Short Burst Data (SBD) radio consumes a fraction of the SWAP of a discovery radio such as Link 16. An alternate set of discovery techniques utilize the directional links themselves for discovery. But for narrow beam systems, a very large number of tiles must be searched repeatedly on a regular basis, even if no node is there to link with. This results in substantial resources being wasted on the directional link. A need, therefore, exists for improved discovery and acquisition methods for use in directional networking.

SUMMARY

In one aspect, the invention may provide a method of dynamically planning a network comprising: determining one or more desired network parameters for connecting nodes to a network; determining one or more decision variables regarding one or more of the group of: (a) radios in the network and (b) nodes in the network; determining constraints to narrow possible values of one or more of the group of: (a) the network parameters and (b) the decision variables based on one or more of the group of: (a) values associated with connecting a radio to a node in the network, (b) values associated with connecting two nodes in the network together over a communication link, (c) whether a node can connect to a global information grid (GIG) node and (d) a flow balance in the GIG node; for each possible communication link in the network, minimizing an equation based on the network parameters, constraints and decision variables to determine a plurality of optimal communication links between one or more of the group of: (a) pair of nodes in the network, (b) pair of nodes and radios and (c) pairs of radios; and establishing at least one of the optimal communication links in the network.

In another aspect, the invention may provide a method of proactively switching between radio links comprising: establishing a first communication link between a first radio of an object that is in motion and a second radio; determining a first radio link quality value between the first radio and the second radio, wherein the first radio link quality value is based, at least in part, on a parameter associated with a first movement of the object; determining a second radio link quality value between the first radio and a third radio, wherein the second radio link quality value is based, at least in part, on a parameter associated with predicted a future second movement of the object; determining a second communications link to establish between the first radio and the second radio based, at least in part, on the first link quality value and the second link quality value; and establishing the second communication link and deactivating the first communication link.

In another aspect, the invention may provide a system comprising: a plurality of nodes; a plurality of connectivity predictor logics respectively located in the nodes; a plurality of real-time distributed network planner logics respectively located in the nodes; and radio control logic; wherein the plurality of nodes comprises a local node and an additional node within wireless range of the local node; the plurality of connectivity predictor logics comprises a local connectivity predictor logic located in the local node; each connectivity predictor logic is configured to predict future possible wireless communication links between the local node and the additional node; the local connectivity predictor logic is configured to predict the future wireless communication links based, at least in part, on one or more of the group of: (a) a field-of-regard of an antenna of the local node, (b) line of sight obstructions between the local node and another node, (c) frequency matching between the local node and a radio, (d) an angle between antennas on the local node and a radio, (e) a distance between the local node and a radio, and (f) polarities of antennas on the local node and a radio; each distributed network planner logic is configured to determine an optimal communication link to be established between the local node and the additional node based, at least in part, on the future wireless communication links predicted by the local connectivity predictor logic: and the radio control logic is configured to establish the optimal communication link.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 8 illustrates some variables, parameters, constraints, other data and equations useful when maintaining hotspot backbone networks.

Similar numbers refer to similar parts throughout the drawings.

DETAILED DESCRIPTION

Figure 1:
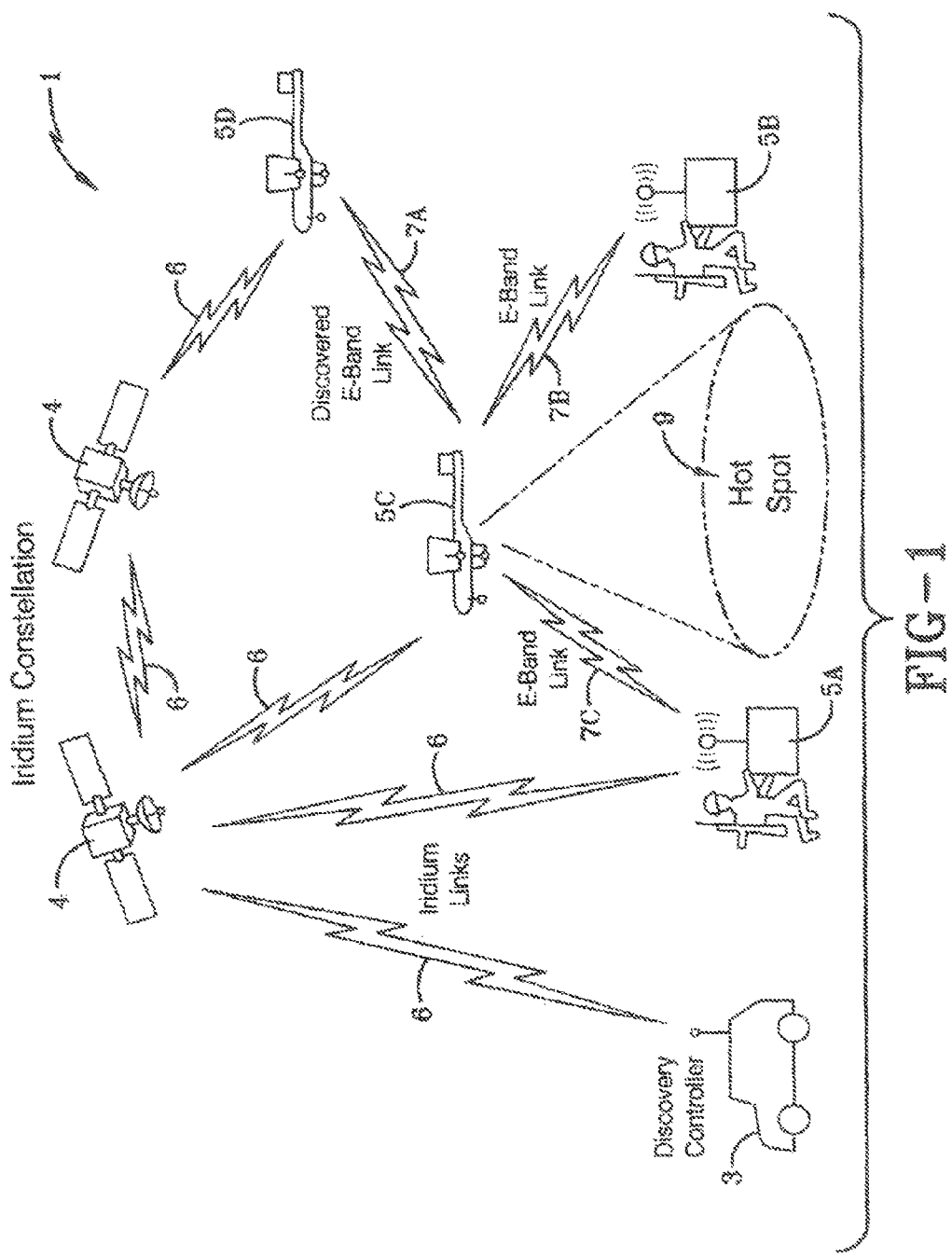
FIG. 1 illustrates an embodiment of a system for connecting a radio with a directional radio to a fast network.

FIG. 1 illustrates an embodiment of a system 1 for managing nodes entering a network. The system 1 includes a global network controller (NC) 3 that is used to register the location and status of nodes capable of directional networking links. As indicated in FIG. 1, the NC 3 also acts as a discovery controller/server. At one point in time, the system 1 may include three nodes 5A-C already connected to the network. Later, a disconnected node 5D may enter the network and desire to connect to the network. Node 5D may be aware of the NC 3 and send slow messages to NC 3 over slow links 6. For example, it could send slow messages to the NC through a slow satellite link such as through the Iridium constellation of satellites 4. When the disconnected node 5D becomes sufficiently close to form a link, the NC 3 starts passing the location of the new neighbor node 50 to each of the nodes 5B, 5C that NC 3 believes can now form a new directional link 7A. NC 3 might also give navigational guidance to the new node 5D to help node 5D connect to the network. The NC 3 continues to provide location information until the status of the network indicates that the desired new link 7A has been formed.

Once the nodes 5C, 5D have formed a directional link 7A that is part of a fast network, they broadcast their location to every other node 5A-D on their network fragment connected by directional links 7A-C. Typically this can be done at a much higher rate than on the satellite communications (SATCOM) links 6 permitting all nodes 5A-D to be aware of all other nodes 5A-D on the same network fragment. The nodes then autonomously decide what links to make and break based on the information passed on the directional links rather than the SATCOM links.

A suitable SATCOM infrastructure is the Iridium Short Burst Data (SBD) service but other systems can be used. Other Iridium services (such as Netted Iridium or Circuit Switched Data) can also be used or other SATCOM systems such as OrbComm or mobile user objective system (MUOS).

The Iridium SBD links have high latency. To accommodate the latency, an acquisition system must be tolerant of substantial initial miss-pointing due to many sources of error, including relative motion of the nodes between position updates. These motions may be partially compensated with suitable prediction algorithms as well. The maximum error in the system 1 can be determined, and a suitable search beamwidth and search pattern can be established. The search beamwidth might be variable based on the distance between the nodes with a wider search beam being used when nodes are close together due to the reduced path loss allowing operation further down the directional beam sidelobes.

To reduce synchronization concerns, dwell times in the search pattern can be set to double the modem acquisition time, ensuring that even if the antennas are switching between search tiles in the pattern asynchronously, links can be acquired. The terminals would then use a "Stare and Scan" search technique where the NC 3 requests one node to "stare" at one tile in the pattern for N dwell times where N is the number of tiles in the search pattern. The other node is told by the NC 3 to scan all tiles in the pattern consecutively using one dwell time each. The Staring node would then move incrementally to the next tile in the search pattern and hold for another N dwells and so on. If on-platform pointing errors can be sufficiently reduced and both nodes have a suitable time reference (such as GPS), synchronous scan techniques can be applied where both nodes increment every dwell time through complementary search patterns and the dwell time need only account for a single modem acquisition time.

The embodiment shown in FIG. 1 also implements a Hot Spot Discovery (HSD) network 9. This can be implemented using Iridium's Short Burst Data (SBD) service or another service. While Iridium is proposed, other systems such as Orbcomm or MUOS could also be used. The Iridium based approach allows the discovery radio to be reduced to a mere 30 grams and less than 1 Watt average power! This approach allows not just for 100 Km line of site (LOS) discovery, but true global discovery and management of the network.

The primary role of discovery is to help disconnected nodes connect to the hot spot backbone (HSB) network, and to help HSB fragments to connect/reconnect. To do this, the system includes the NC 3, which implements a discovery service. All nodes periodically send SBD to the NC 3, which tracks the location and status of every one of the connected nodes. Certain nodes—those which have not yet entered the HSB or have become disconnected due to mobility—leverage the NC 3 to become connected. When the NC 3 detects that disconnected nodes/fragments are within range of each other, NC 3 will inform them of each other's positions and request specific nodes to form links using SBD. The NC 3 will repeatedly pass position data to nodes that need to link until their SBD status reports indicate a successful link. Round trip latencies of 10 seconds are expected for Iridium SBD. The process to form a link (once both nodes are informed) may take less than 5 seconds. So network discovery will typically take less than 15 seconds. This is enabled by the ability to predict node positions sufficiently in the future with the connectivity predictor and accommodate substantial miss-pointing with the partial nodular transformation (PNT) approach. Because of the low data rates, this approach can scale to more than 20 nodes.

Once on the HSB, nodes regularly broadcast their positions to all other nodes on the network. Route and topology management proactively determine when new links are formed/torn down. Link instantiation may take less than 5 seconds for nodes connected to each other via the HSB and does not involve the NC or Iridium SBD. Link instantiation/termination can be timed so as not to impact network quality of service (QoS).

Figure 2:
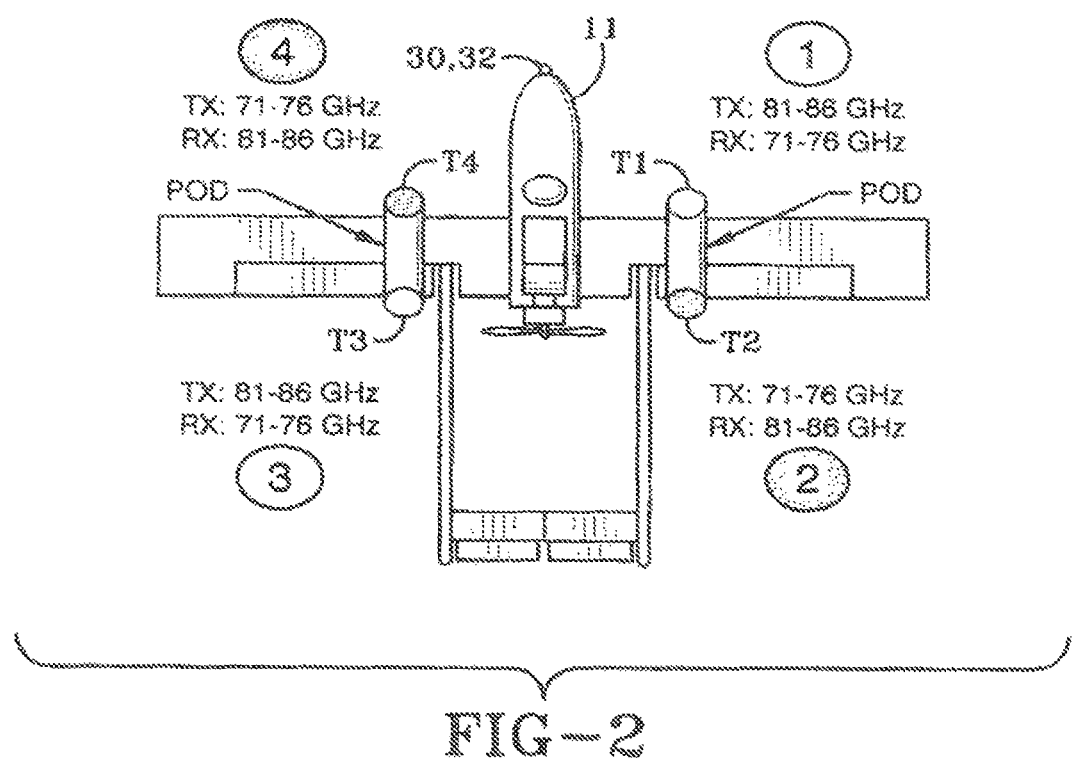
FIG. 2 illustrates an example frequency division duplex (FDD) configuration on a notional Unmanned Aerial Vehicle (UAV) with multiple genders (full duplex).

Having described the major features of the sample embodiment, other details will now be described. FIG. 2 illustrates a frequency division duplex (FDD) configuration on a notional UAV 11 with multiple genders (full duplex). Ideally, a proposed distribution of radio genders provides 360 degree azimuthal coverage for communication with target radios of either gender below the horizon (i.e., ground-based radios).

Figure 3:
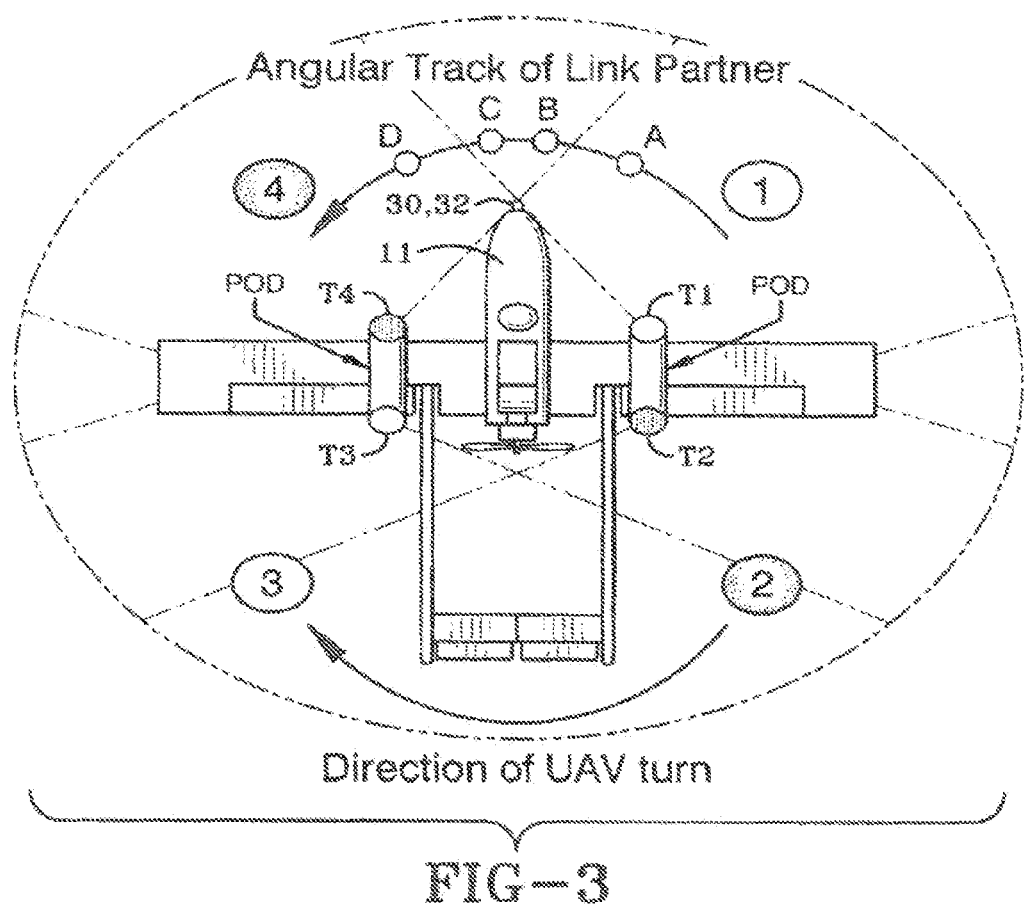
FIG. 3 depicts a predictive routing (PR) handoff scenario as the UAV makes a turn.

For an air target, the field of regard is hindered by the line of site (LOS) obstructions of the airframe (FIG. 3). Even with these obstructions, four azimuthal regions supporting various handoff combinations for an air-to-air link are possible. The FDD configuration guarantees that all handoffs will be cross-polarity. Cross-polarized simultaneous links and future wireless communication links can be supported by the sample embodiment by both air and ground nodes. Links will be configured for different channels to prevent co-channel interference. FIG. 3 depicts a Predictive Routing (PR) handoff scenario as the UAV 11 makes a turn. Say a neighbor UAV (link partner) occupies angular positions A, B, C, and D as illustrated in FIG. 3. At position A, PR maintains a link via transceiver T1. At B, PR still relies on transceiver T1's link. PR now identifies that the link partner will soon track out of transceiver T1's field of regard. A router then steers transceiver T4 into position and requests/acquires a second redundant link (assuming a spare transceiver at the neighbor UAV 11 available). At C, PR fully acquires a redundant link, then drops transceiver T1's link and serves transceiver T4's link. At D, the PR relies on transceiver T4.

Figure 4:
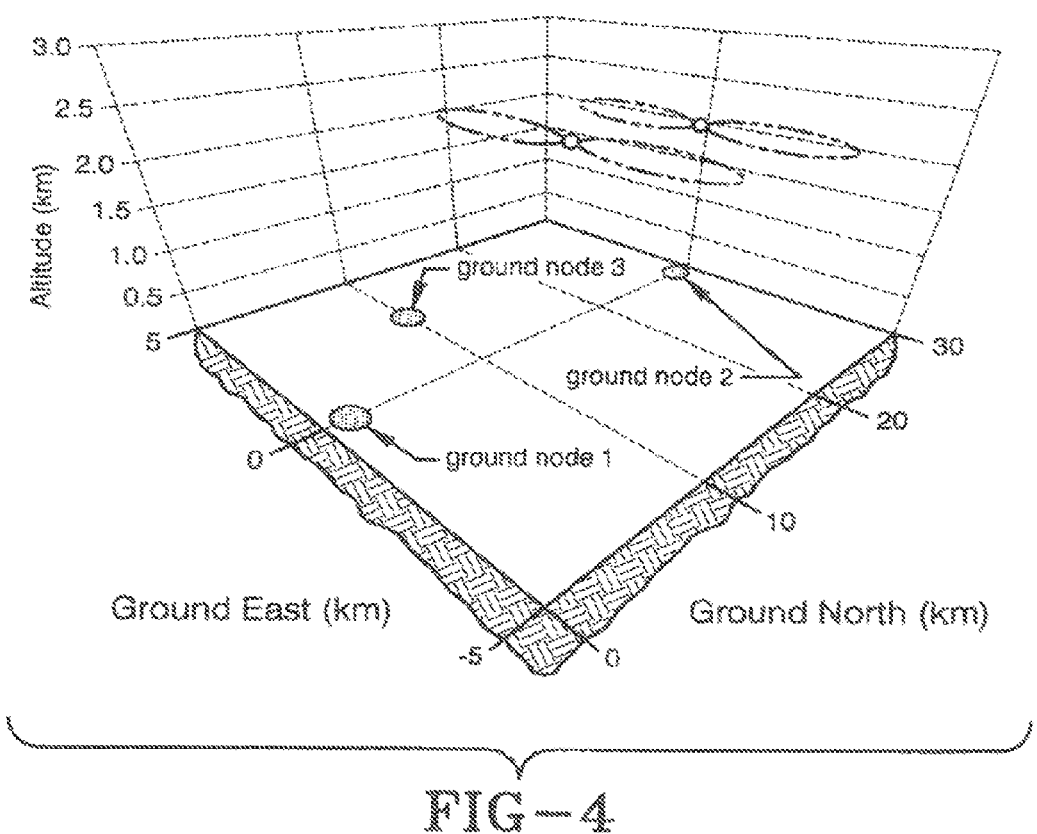
FIG. 4 illustrates an example of modeling of the PR strategy that was simulated.

Modeling of the PR strategy was performed as illustrated in FIG. 4. The modeling assumed a phase 3 reference demo; that is, 3 ground nodes and 2 UAVs flying in a figure-8 ("lemniscate of Bernouilli"). Time for steering the transceiver antenna and FDD reconfiguration were accounted for in the model based on signal-to-noise ratio (SNR) link budget with allowable millimeter wave (mmW) pointing error. Initial position/ heading info was assumed to be available with high accuracy. Average UAV speed was 150 km/hr (typical of the RQ-7 Shadow UAV). Ground-Air and Air-Air links were carefully evaluated under various motion configurations (East-West, North-South). A reactive routing scheme, where a router acquires a new link upon outage, was modeled for comparison purpose. Clearly, reactive routing and PR outperform a conventional approach in all motion cases. The PR performs best, as reactive routing is late-reactable to the UAV motion. By the time the router steers its transceiver to a new position (or switches to a new transceiver), the link partner is already in the deaf state. PR can request a new link in advance and forward traffic there. In general, UAV motion configuration plays a major role in end-end coverage. For example, a serial arrangement (South-North) with fixed ground nodes can result in fewer disruptions than a parallel arrangement at the expense of larger downtime. Diversity of traffic flows and available UAV link interfaces are also important considerations in a prediction strategy.

Hotspot Radio Ground Coverage

Figure 5:
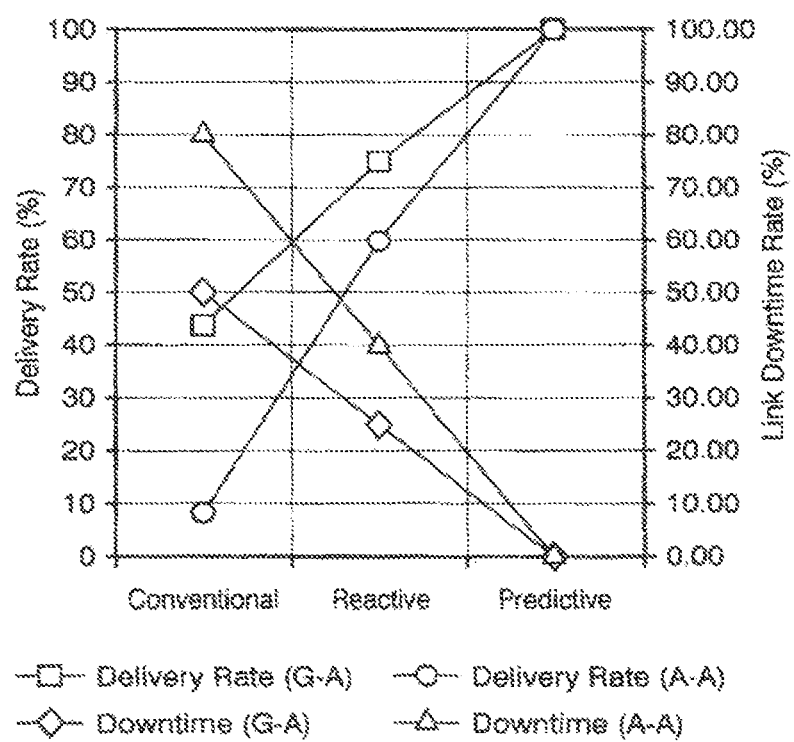
FIG. 5 illustrates the results of the PR that was simulated according to FIG. 4.
Figure 6:
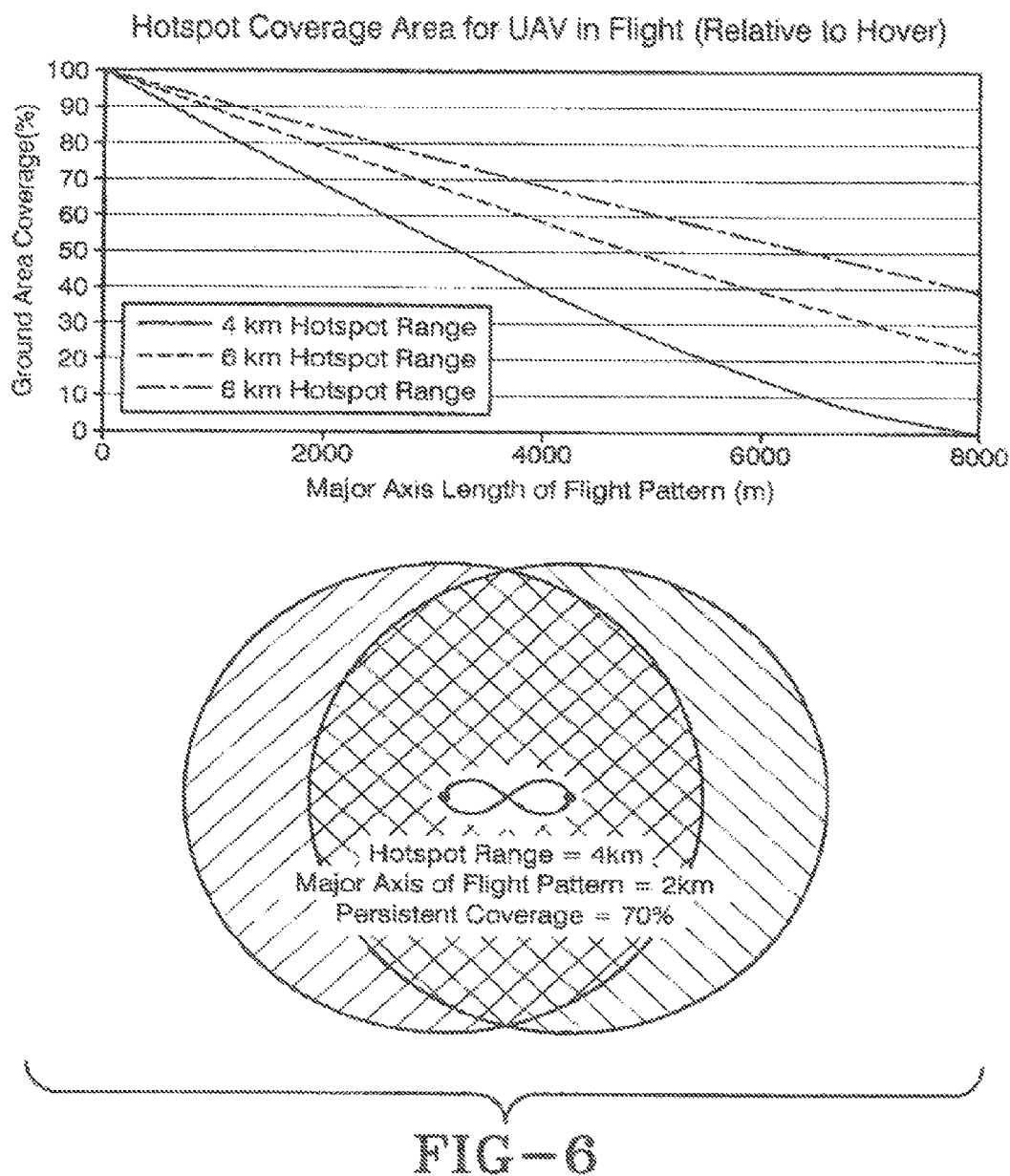
FIG. 6 illustrates the hotspot coverage area for an UAV in flight (relative to hover).

Relative to fixed infrastructure, a hotspot radio mounted to a mobile airborne base station is challenged to deliver persistent service to static ground areas. Consider a Shadow UAV at a 1.5 km altitude. Projecting the hotspot radio signal 4 km away requires a beamwidth more than 140° in both E/H planes. Allowing for banked turns of up to 20° in either direction dictates a hemispherical antenna pattern (180°, 3 dBi). With a downward looking fixed hotspot antenna, persistent ground coverage pattern is determined by the hotspot radio range and the flight pattern. For typical flight patterns with a relatively long major axis (e.g., figure-8, racetracks), persistent coverage area is well-approximated as the intersection of two circles centered at the extremes of the flight pattern. If the flight pattern's turn radius is too small, the increased bank angle will distort the ground spot and disrupt the mmW links. As shown in FIGS. 5 and 6, a 2-km-long flight pattern minimizes these affects while delivering coverage of 70% times maximum. Note that for a fixed flight pattern, coverage percentage increases with hotspot range.

Maintaining the HotSpots Backbone Network

Figure 7:
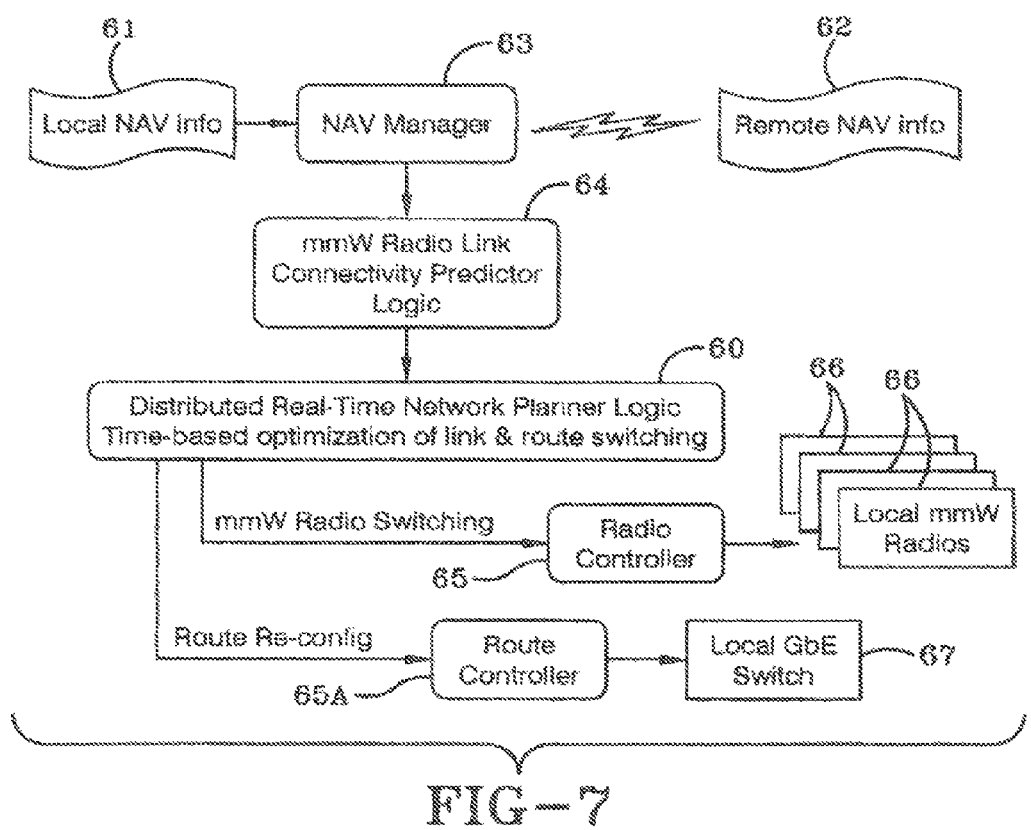
FIG. 7 illustrates some of the components of an example distributed network manager.

As illustrated in FIG. 7, a distributed real time network planner logic 60 can be implemented as a distributed software system that uses prediction of location and orientation of HSB nodes to maintain HSB network connectivity. This system is identical in each HSB node and ensures coordinated control of mmW radio links via GPS-synchronized protocol messages exchanged over the HSB network. A distributed implementation can be chosen so that the HSB network is resilient to any combination of node failures or disconnects.

At its core, distributed network planner logic 60 decides future mmW radio link setups and teardowns to avoid network disconnects based on predicted possible radio connections. The possibility of a connection between any two mmW radios is determined by the connectivity predictor logic 64 (FIG. 7) based on expected future relative position and orientation range of the radios' gimbals. The local navigation (NAV) info 61 and remote NAV info 62 (current position, orientation, velocity, and expected flight path) is collected from and exchanged with neighbor HSB nodes by the NAV manager 63 over a link-state-like protocol transmitted over the HSB network. The network planner logic 60 actuates new radio connections via the radio controller 65 as well as new network route connection via the route controller 65A. Note that the network planner logic 60, NAV manager 63, mmW radio link connectivity predictor logic 64 and other components of this figure or the other figures can be implemented in hardware logic and/or software logic.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The network planner logic 60 also chooses the next set of radio links and routes that maximizes the number of HSB nodes connected to the global information grid (GIG) (in the order of their QoS priority), while minimizing the total path cost. Links have higher (or infinite) costs when distance is larger (or too large). The static case (with no changes in radio connectivity) is solved as a minimum cost network flow problem with variable source/sink flows that depend on the decisions made in connecting the nodes (UAVs) via radios and with penalty terms to encourage node connectivity to the GIG gateway node.

A method of proactively switching between radio links is provided, which may include establishing a first communication link between a first radio of an object that is in motion and a second radio; determining a first radio link quality value between the first radio and the second radio, wherein the first radio link quality value is based, at least in part, on a parameter associated with a movement of the object; determining a second radio link quality value between the first radio and a third radio, wherein the second radio link quality value is based, at least in part, on a parameter associated with a predicted future movement of the object; determining a second communications link to establish between the first radio and the second radio based, at least in part, on the first link quality value and the second link quality value; and establishing the second communication link and deactivating the first communication link. The quality values may include or be based on the cost of the communication links. The parameter associated with the first movement may be selected from at least one of the group of: a current position of the object, an orientation of the object, a velocity of the object, and expected future position of the object. The object may be an unmanned aerial vehicle (UAV) such that the expected future position of the object is an expected flight path.

One configuration or embodiment may be a system for minimizing the cost of wireless communication links in a network. The system includes distributed connectivity predictor logics, real-time distributed network planner logics and radio control logic. The connectivity predictor logics are each located in a node of the network and each predicts future possible wireless communication links. More specifically, a first or local node that has a local connectivity predictor logic that resides in it predicts possible links between the local node and other possible moving nodes and/or non-moving nodes within wireless range of the local node. The connectivity predictor logics predict the future wireless communication links based, at least in part, on one more of: the field-of-regard of an antenna of local node, line of sight (LOS) obstructions between the local node and another node, frequency matching between the local node and a radio, angles between antennas on the local node and a radio, a distance between the local node and a radio and the polarities of antennas on the local node and a radio. The real-time distributed network planner logics are also each located in a node of the network. Each distributed network planner logic determines optimal communication link(s) to be established between the local node and the other moving nodes and/or the non-moving nodes within wireless range of the local node based, at least in part, on the future wireless communication links predicted by the local connectivity predictor logic. The radio control logic can then establish the optimal communication link before a current link fails.

The Integer Programming formulation of this problem has a number of constraints order of number of HSB node pairs, which for 20 nodes is 190. Open source solvers (LP Solve) or commercial (CPLEX) are known to solve such problems with over 100,000 constraints within one second. The dynamic case includes predicted events that change radio connectivity.

FIG. 8 illustrates some variables, parameters, constraints and other data useful when maintaining hotspot backbone networks. A primary objective is to minimize the number of nodes without a path to the GIG gateway, especially those with high QoS priority. An equation of this objective is located in the tenth line of FIG. 8. The equation also chooses the shortest paths. The limitations of mmW radio connectivity due to field-of-regard, LOS obstructions, frequency matching, distance, etc. are modeled by the Link Connectivity Predictor in the link parameters $q(m,i,n,j,t)$ based on current and predicted NAV of local and remote nodes. The decisions to connect radios i and j ($y(m,i,n,j,t)$) are limited by the physical conditions (constraints 1, 2). This formulation aims to establish a set of information flows $x(n,m)$ (constraints 3,4,5) that connect each node to the GIG gateway, which also insures pair-wise connectivity throughout the SKYNET backbone network (SKYN). To minimize the duration of path disconnects, Integer Programming formulation with heuristics—such as rollout and limited horizon look ahead—can also be used to monitor the status of different paths/links.

The high throughput of the SKYN can lead to significant data loss even in millisecond link disruptions. The way of preventing this is avoiding any link and route disconnects through the Predictive Backbone Routing described above. The second way to prevent this is within the embedded network switch hardware, where high-speed buffers absorb mmW radio disconnects of milliseconds for a typical hardware switch buffer of 1 MB. The switch can be configured to provide high priority forwarding and reserved bandwidth to mission-critical traffic using differentiated services code point (DSCP). This 6-bit marking is exchanged across a red/ black boundary according to the current high assurance internet protocol encryption (HAIPE) standard. A third reliability layer can be provided by an Internet protocol-layer (IP-layer) gateway implemented in software running on the session border control (SBC) of each node. The Predictive Routing can predict upcoming link and route disruptions and reconfigure the route of high QoS priority hotspot traffic to divert through the local IP-layer gateway. Assuming the high-priority traffic is a relatively small fraction of the total traffic, the SBC memory can accumulate traffic for 100s of milliseconds. For example, 1 GB of memory can buffer 100 Mb/s traffic for 80 seconds.

Topology Control for the Backbone Network

Topology management is a major challenge in directional mmW ad-hoc networks given the high directionality of the radios. Network nodes must point their antennas toward each other to establish and maintain a link. Provisioning of a connected network topology in this context at all times, as nodes move, has proven to be difficult. Current approaches to network entry and link establishment often yield high latencies due to expensive blind space searches and unsynchronized beam scanning. In the sample embodiment, topology management and control approach departs from current practices by incorporating prediction and maintenance of future network topologies. A distributed approach is based on existing and planned trajectory information of the nodes and link coverage possibilities Local flocking rules similar to those birds follow have been proposed as a UAV placement and navigation strategy to solve ground network connectivity with mobile nodes. The preferred approach to the SKYPOINT AP coverage is different. Knowledge of the field, strategic planning, carefully chosen low-SWAP radios and wide-aperture antennas are used to provide optimal coverage to the ground nodes, and will investigate the potential benefits of switched beam directional hotspot radio antennas.

Reliable End-End Data Delivery

There are multiple approaches to the reliability problem (e.g., end-end or hop-hop). Standard end-end approaches (TCP) were originally designed for wire-line environments and suffer from severe performance degradation due to packet errors in the wireless network. Performance Enhancement Proxies improve the end-end performance but fail when placed in front of encryption devices. On the other hand, hop-hop approaches at layer 2 are ill-equipped to deal with aggregate traffic and medium-to-high latency disruptions. A DTN approach for long-term mid-path caching provides a viable alternative. The approach of the preferred embodiment is a 3-tier reliability strategy taking the duration of the link outage into consideration. Predictive switching can anticipate and provide backup routes for small-duration outages. Local link level buffering is appropriate for medium-duration outages (tens of milliseconds). Layer-3/4 reliability approaches such as those used in prior defense advanced research projects agency (DARPA) work can be leveraged for longer-term outages.

Predictive Routing with QoS

Predictive Routing is often required for network control due to frequent topology changes caused by a node's mobility. In Mobile Hotspots, frequent topology changes are primarily caused by UAV mobility and limited antenna field-of-regard. The preferred Predictive Routing approach takes into account the flight patterns, UAV LOS obstructions and field of regard to select which radio links to form. DSCP markings can be added in the IP headers to protect high-priority traffic insuring QoS Routing.

Node Discovery

Traditional approaches to Neighbor Discovery in directional ad-hoc networking make use of omni-directional radios as a relatively faster way of pairing nodes. Neighbor discovery protocols, service-oriented architecture (SOA) based discovery services, reliable broadcast MAC-layer services and deterministic synchronized scanning techniques were studied and analyzed to reduce network overhead.

The SKYPOINT approach is a method based on satellite communications using a low-cost, low-power Iridium device. These Iridium solutions provides true global discovery to all nodes in the domain. The major cost is latency although this is mitigated via navigation prediction and concept of operations (CONOPS).

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
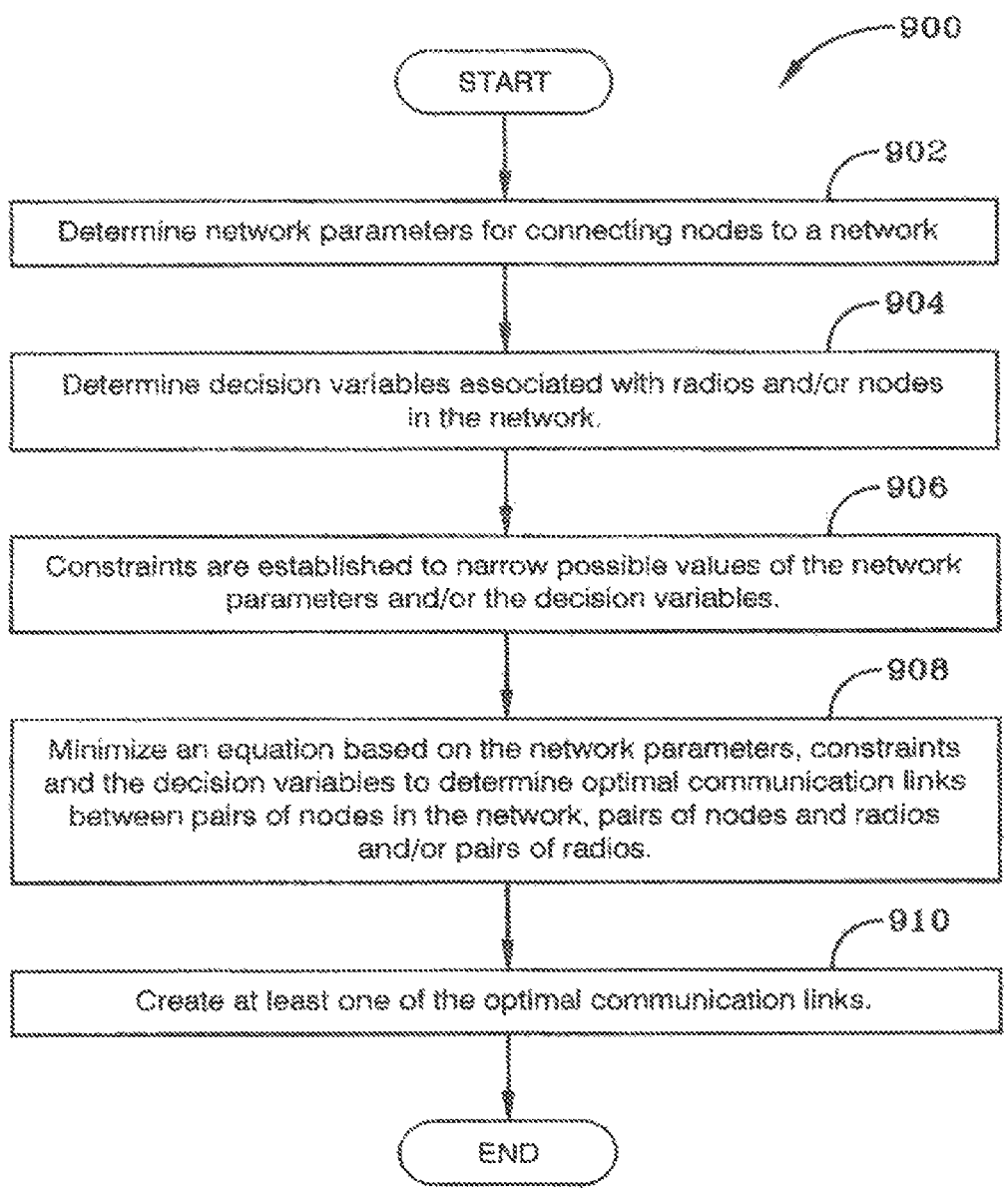
FIG. 9 illustrates an embodiment of a method for determining optimal links in a network.

FIG. 9 illustrates a method 900 of method for dynamically planning a network. Once such method may begin, at 902, by determining network parameters for connecting nodes to a network. Decision variables associated with radios and/or nodes in the network are also determined, at 904. Constraints are established, at 906, to narrow possible values of the network parameters and/or the decision variables. The constraints are based on one or more of: values associated with connecting a radio to a node in the network, values associated with connecting two nodes in the network together over a communication link, whether a node can connect to a GIG node and a flow balance in the GIG node. For possible links in the network, the method minimizes, at 908, an equation based on the network parameters, constraints and the decision variables to determine optimal communication links between pairs of nodes in the network, pairs of nodes and radios and/or pairs of radios. The method creates or establishes at least one of the optimal communication links, at 910.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of proactively switching between radio links comprising:

establishing a first communication link between a first radio of an object that is in motion and a second radio;

determining a first radio link quality value between the first radio and the second radio, wherein the first radio link quality value is based, at least in part, on a parameter associated with a first movement of the object;

determining a second radio link quality value between the first radio and a third radio, wherein the second radio link quality value is based, at least in part, on a parameter associated with a predicted future second movement of the object;

determining a second communications link to establish between the first radio and the second radio based, at least in part, on the first link quality value and the second link quality value;

establishing the second communication link;

deactivating the first communication link;

wherein the parameter associated with the first movement object is selected from at least one of the group of: a current position of the object, an orientation of the object, a velocity of the object, and expected future position of the object; and wherein the object is an unmanned aerial vehicle (UAV) and the expected future position of the object is an expected flight path.

* * * * *